(12) United States Patent
 Uematsu et al.

(10) Patent No.: US 10,879,763 B2
(45) Date of Patent: Dec. 29, 2020

(54) ELECTRIC ACTUATOR

(71) Applicant: NIDEC TOSOK CORPORATION, Kanagawa (JP)

(72) Inventors: Yutaka Uematsu, Kanagawa (JP); Shun Kato, Kanagawa (JP); Ryunosuke Oikawa, Kanagawa (JP); Yuzo Akasaka, Kanagawa (JP); Kazumi Shinkai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 75 days.

(21) Appl. No.: 16/234,602

(22) Filed: Dec. 28, 2018

(65) Prior Publication Data

US 2019/0207475 A1   Jul. 4, 2019

(30) Foreign Application Priority Data

Dec. 28, 2017   (JP) .................................. 2017-253675

(51) Int. Cl.
 *H02K 7/116* (2006.01)
 *H02K 7/08* (2006.01)
 (Continued)

(52) U.S. Cl.
 CPC ........... *H02K 7/116* (2013.01); *F16H 19/001* (2013.01); *F16H 57/02* (2013.01); *H02K 5/08* (2013.01);
 (Continued)

(58) Field of Classification Search
 CPC ........ H02K 7/116; H02K 5/08; H02K 5/1732; H02K 5/225; H02K 7/083; H02K 11/215;
 (Continued)

(56) References Cited

U.S. PATENT DOCUMENTS

| 2007/0023008 | A1* | 2/2007 | Kondo | ..................... F02D 11/10 |
| | | | | 123/336 |
| 2010/0170355 | A1* | 7/2010 | Kume | ..................... F16H 61/32 |
| | | | | 74/63 |

(Continued)

FOREIGN PATENT DOCUMENTS

| JP | 2009065742 | 3/2009 |
| JP | 2015200347 | 11/2015 |
| JP | 2016100910 | 5/2016 |

*Primary Examiner* — John K Kim
(74) *Attorney, Agent, or Firm* — JCIPRNET (57) ABSTRACT

An electric actuator is provided and includes: a motor unit having a motor shaft extending in an axial direction, a speed reducer connected to one side of the motor shaft in the axial direction, an output section having an output shaft to which rotation of the motor shaft is transmitted via the speed reducer, and a housing accommodating the motor unit, the speed reducer and the output section. The motor shaft and the output shaft are disposed apart from each other in the radial direction of the motor shaft. The motor unit has a first bearing that rotatably supports the motor shaft. The housing has a housing main body formed of resin, and a metal member formed of metal and held by the housing main body. The metal member has a bearing holding section that holds the first bearing, and an output shaft support section that supports the output shaft.

13 Claims, 7 Drawing Sheets

(51) Int. Cl.
  *F16H 63/34* (2006.01)
  *H02K 21/14* (2006.01)
  *H02K 11/215* (2016.01)
  *H02K 5/22* (2006.01)
  *H02K 5/173* (2006.01)
  *H02K 5/08* (2006.01)
  *F16H 19/00* (2006.01)
  *F16H 57/02* (2012.01)
  *F16H 61/32* (2006.01)
  *F16H 1/32* (2006.01)

(52) U.S. Cl.
  CPC ........... *H02K 5/1732* (2013.01); *H02K 5/225* (2013.01); *H02K 7/083* (2013.01); *H02K 11/215* (2016.01); *H02K 21/14* (2013.01); *F16H 1/32* (2013.01); *F16H 61/32* (2013.01); *F16H 2001/325* (2013.01); *F16H 2057/02034* (2013.01); *H02K 2211/03* (2013.01)

(58) Field of Classification Search
  CPC .. H02K 21/14; H02K 2211/03; F16H 19/001; F16H 57/02; F16H 61/32; F16H 2057/02034; F16H 2001/325; F16H 1/32
  USPC ...................................................... 310/83, 89
  See application file for complete search history.

(56) References Cited

U.S. PATENT DOCUMENTS

2010/0176666 A1* 7/2010 Abe ........................ H02K 11/33
  310/43
2019/0207475 A1* 7/2019 Uematsu ................ H02K 7/083

* cited by examiner

ELECTRIC ACTUATOR

CROSS REFERENCE TO RELATED APPLICATIONS

The application claims priority under 35 U.S.C. § 119 to Japanese Patent Application No. 2017-253675 filed on Dec. 28, 2017, the entire content of which is incorporated herein by reference and made a part of this specification.

BACKGROUND

Technical Field

The disclosure relates to an electric actuator.

Description of Related Art

An electric actuator including a motor unit, a speed reducer connected to the motor unit, and an output section to which rotation of the motor unit is transmitted via the speed reducer is known, and mounted on an automatic transmission configured to change a speed of an engine output for travel of a vehicle.

In an electric actuator of the related art, a reduction in weight is required. As a method of reducing a weight of the electric actuator, the method of reducing a weight of a housing by forming the housing using a resin is exemplified. However, in this case, molding accuracy of the housing may decrease in comparison with using a metal, and relative positional accuracy between a motor shaft of the motor unit held in the housing and an output shaft of the output section is likely to decrease.

In consideration of the above-mentioned circumstances, the disclosure can achieve reduction in weight of an electric actuator and minimize a decrease in relative positional accuracy between a motor shaft and an output shaft.

SUMMARY

An aspect of an electric actuator of the disclosure includes: a motor unit, having a motor shaft extending in an axial direction; a speed reducer, connected to one side of the motor shaft in the axial direction; an output section, having an output shaft to which rotation of the motor shaft is transmitted via the speed reducer; and a housing, configured to accommodate the motor unit, the speed reducer and the output section. The motor shaft and the output shaft are disposed apart from each other in the radial direction of the motor shaft. The motor unit has a first bearing configured to rotatably support the motor shaft. The housing has a housing main body formed of a resin, and a metal member formed of a metal and held by the housing main body. The metal member has a bearing holding section configured to hold the first bearing, and an output shaft support section configured to support the output shaft.

According to an aspect of the disclosure, it is possible to provide an electric actuator having a structure capable of achieving reduction in weight and minimizing a decrease in relative positional accuracy between a motor shaft and an output shaft.

The above and other elements, features, steps, characteristics and advantages of the disclosure will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF THE EMBODIMENTS

In the drawings, a Z-axis direction is an upward/downward direction in which a positive side is directed upward and a negative side is directed downward. An axial direction of a central axis J1 that is a virtual axis appropriately shown in the drawings is parallel to the Z-axis direction, i.e., the upward/downward direction. An X-axis direction is a direction perpendicular to the Z-axis direction. A Y-axis direction is a direction perpendicular to both of the Z-axis direction and the X-axis direction. In the following description, a direction parallel to the axial direction of the central axis J1 is simply referred to as "an axial direction Z," a direction parallel to the X-axis direction is simply referred to as "a first direction X" and a direction parallel to the Y-axis direction is simply referred to as "a second direction Y." In addition, a radial direction about the central axis J1 is simply referred to as "a radial direction" and a circumferential direction about the central axis J1 is simply referred to as "a circumferential direction" unless the context clearly indicates otherwise. In the embodiment, an upper side corresponds to one side in the axial direction. Further, upper and lower sides are simply names for describing relative positional relations of parts, and an actual dispositional relation or the like may be a dispositional relation or the like other than the dispositional relations or the like indicated by these names.

Figure 1:
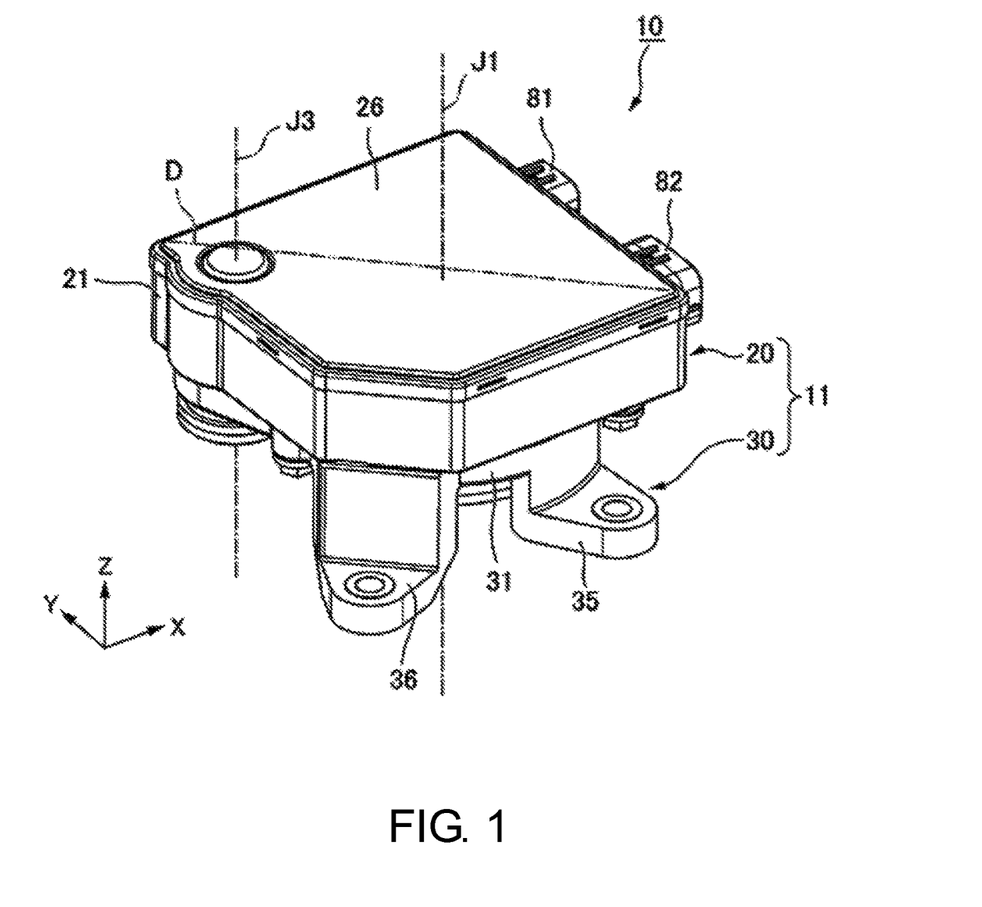
FIG. 1 is a perspective view showing an electric actuator of an embodiment.
Figure 2:
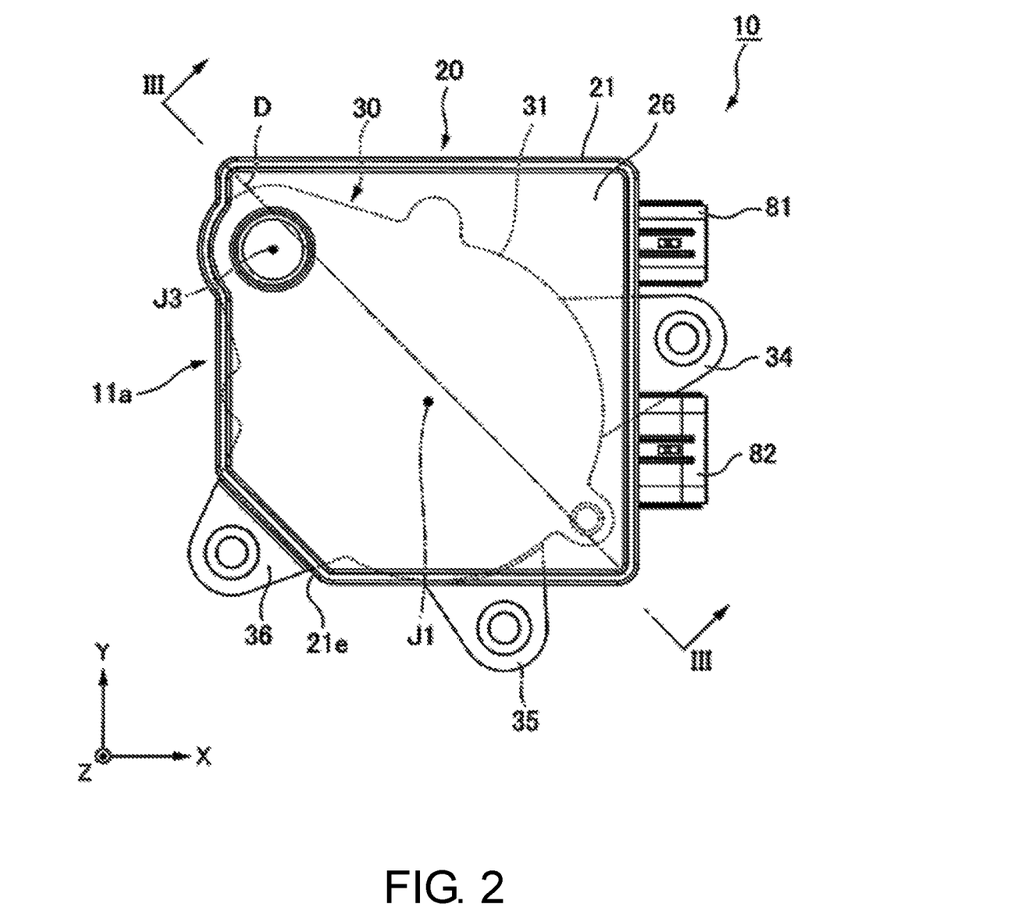
FIG. 2 is a view showing the electric actuator of the embodiment as viewed from above.
Figure 3:
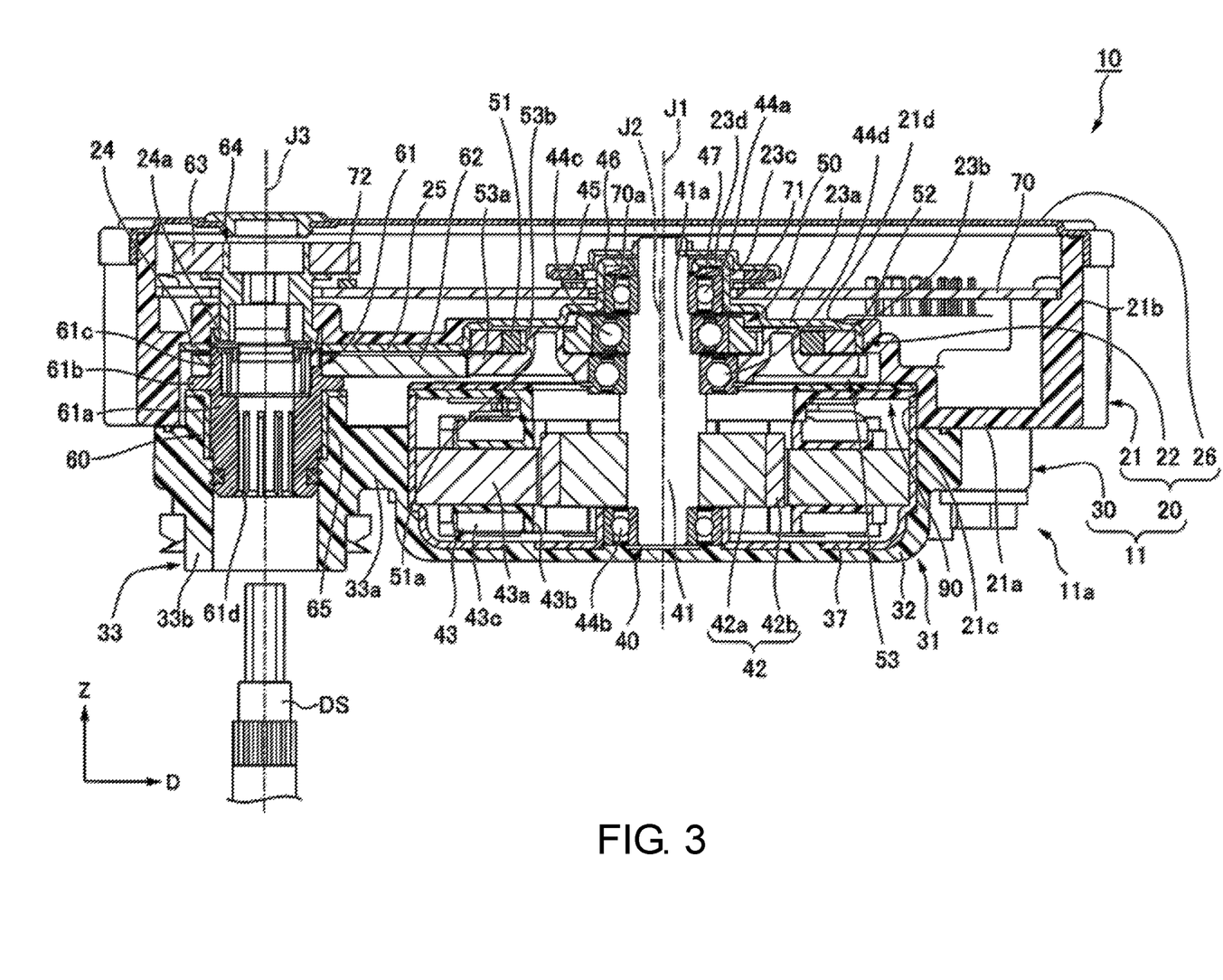
FIG. 3 is a cross-sectional view taken along line III-III in FIG. 2, showing the electric actuator of the embodiment.

An electric actuator 10 of the embodiment shown in FIG. 1 to FIG. 3 is attached to a vehicle. More specifically, the electric actuator 10 is mounted on an actuator apparatus using a shift-by-wire method driven on the basis of a shift operation of a driver in the vehicle. As shown in FIG. 3, the electric actuator 10 includes a motor unit 40, a speed reducer 50, an output section 60, a circuit board 70, a motor unit sensor 71, an output section sensor 72, a housing 11, a bus bar holder 90, and a bus bar (not shown).

The motor unit 40 has a motor shaft 41, a first bearing 44a, a second bearing 44b, a third bearing 44c, a fourth bearing 44d, a rotor main body 42, a stator 43, a sensor magnet 45 for a motor unit, and a magnet holder 46. The motor shaft 41 extends in the axial direction Z.

The first bearing 44a, the second bearing 44b, the third bearing 44c and the fourth bearing 44d support the motor shaft 41 to be rotatable around the central axis J1. In the embodiment, the first bearing 44a, the second bearing 44b, the third bearing 44c and the fourth bearing 44d are, for example, ball bearings.

An eccentric shaft section 41a that is a portion of the motor shaft 41 supported by the third bearing 44c has a columnar shape parallel to the central axis J1 and extending about an eccentric shaft J2 eccentric with respect to the central axis J1. A portion of the motor shaft 41 other than the eccentric shaft section 41a has a columnar shape extending about the central axis J1.

The rotor main body 42 is fixed to the motor shaft 41. More specifically, the rotor main body 42 is fixed to a lower portion of the motor shaft 41. The rotor main body 42 has a rotor core 42a and a rotor magnet 42b. The rotor core 42a is fixed to an outer circumferential surface of a portion of the motor shaft 41 below the eccentric shaft section 41a. The rotor magnet 42b is fixed to an outer circumferential section of the rotor core 42a.

The stator 43 is disposed on an outer side of the rotor main body 42 in the radial direction with a gap. The stator 43 has an annular shape that surrounds an outer side of the rotor main body 42 in the radial direction. The stator 43 has a stator core 43a, an insulator 43b and a plurality of coils 43c. The coils 43c are mounted on the stator core 43a via the insulator 43b.

The magnet holder 46 is formed in an annular shape about the central axis J1. The magnet holder 46 is fixed to an outer circumferential section of an upper end portion of the motor shaft 41. The sensor magnet 45 for a motor unit is formed in an annular plate shape about the central axis J1. A plate surface of the sensor magnet 45 for a motor unit is perpendicular to the axial direction Z. The sensor magnet 45 for a motor unit is fixed to an outer circumferential edge portion of a lower surface of the magnet holder 46 in the radial direction. Accordingly, the sensor magnet 45 for a motor unit is attached to the motor shaft 41 via the magnet holder 46. In the embodiment, the sensor magnet 45 for a motor unit is attached to a portion of the motor shaft 41 protruding above the circuit board 70, and faces an upper surface of the circuit board 70 via a gap.

The speed reducer 50 is connected to an upper side of the motor shaft 41. The speed reducer 50 is disposed over the rotor main body 42 and the stator 43. The speed reducer 50 has an external gear 51, an internal gear 52 and an output gear 53.

Figure 4:
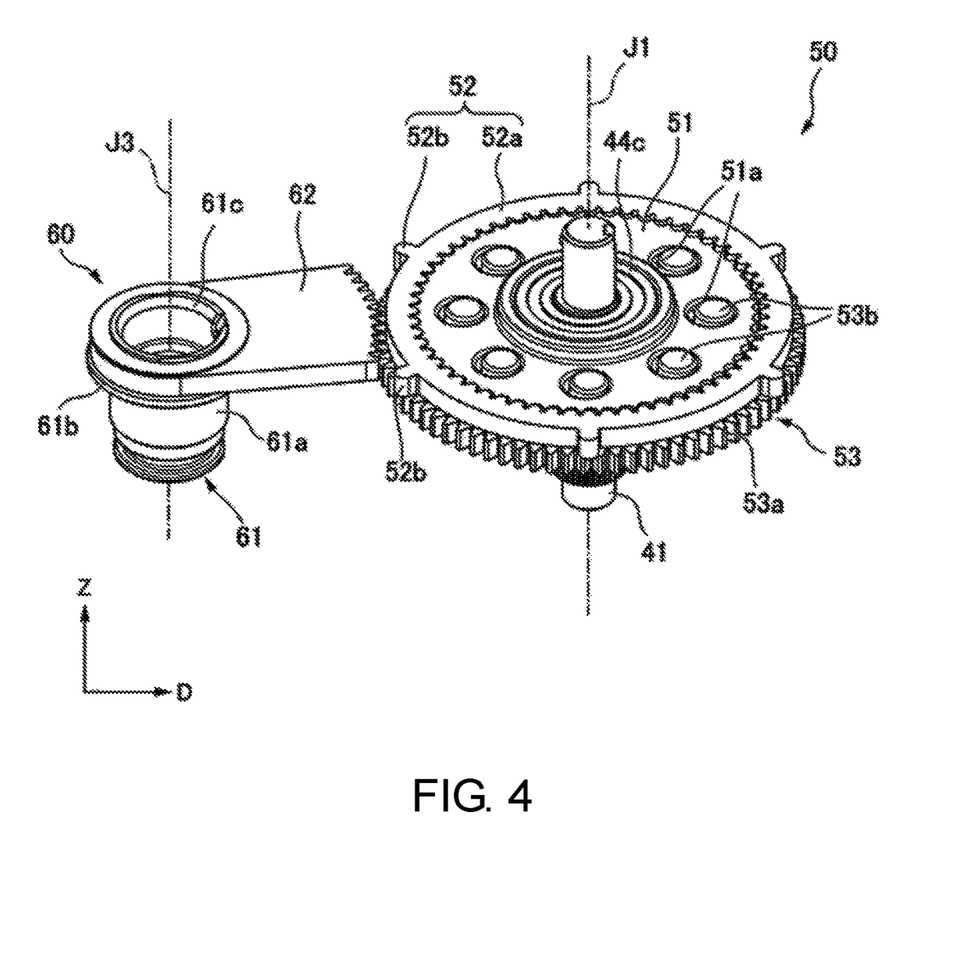
FIG. 4 is a perspective view showing an output section and a speed reducer of the embodiment.

As shown in FIG. 3 and FIG. 4, the external gear 51 is formed in an annular plate shape spreading in the radial direction of the eccentric shaft J2 about the eccentric shaft J2 of the eccentric shaft section 41a. A gear section is formed on an outer surface of the external gear 51 in the radial direction. The external gear 51 is connected to the motor shaft 41 via the third bearing 44c. Accordingly, the speed reducer 50 is connected to the motor shaft 41. The external gear 51 is fitted onto an outer wheel of the third bearing 44c from an outer side in the radial direction. Accordingly, the third bearing 44c connects the motor shaft 41 and the external gear 51 to be relatively rotatable around the eccentric shaft J2.

The external gear 51 has a plurality of holes 51a passing through the external gear 51 in the axial direction Z. The plurality of holes 51a are disposed about the eccentric shaft J2 throughout the circumference in the circumferential direction at equal intervals. As shown in FIG. 4, shapes of the holes 51a seen in the axial direction Z are circular shapes.

The internal gear 52 is fixed to a circuit board case 20 while surrounding an outer side of the external gear 51 in the radial direction, and meshed with the external gear 51. The internal gear 52 is held by a metal member 22 (to be described below) of the housing 11. The internal gear 52 has an internal gear main body 52a and a plurality of protrusion sections 52b. The internal gear main body 52a is formed in an annular shape about the central axis J1. A gear section is formed on an inner circumferential surface of the internal gear main body 52a. The gear section of the internal gear main body 52a is meshed with the gear section of the external gear 51. The protrusion sections 52b protrude from an outer circumferential section of the internal gear main body 52a toward an outer side in the radial direction. The plurality of protrusion sections 52b are disposed throughout the circumference in the circumferential direction at equal intervals.

The output gear 53 has an output gear main body 53a and a plurality of pins 53b. The output gear main body 53a is disposed below the external gear 51 and the internal gear 52. The output gear main body 53a has an annular plate shape spreading in the radial direction about the central axis J1. A gear section is formed on an outer surface of the output gear main body 53a in the radial direction. The gear section of the output gear main body 53a protrudes toward an outer side of the internal gear main body 52a in the radial direction. As shown in FIG. 3, the output gear main body 53a is connected to the motor shaft 41 via the fourth bearing 44d.

The plurality of pins 53b have cylindrical shapes protruding upward from an upper surface of the output gear main body 53a. As shown in FIG. 4, the plurality of pins 53b are disposed throughout the circumference in the circumferential direction at equal intervals. An outer diameter of each of the pins 53b is smaller than an inner diameter of each of the holes 51a. The plurality of pins 53b pass through the plurality of holes 51a from below. An outer circumferential section of each of the pins 53b is inscribed by an inner circumferential surface of one of the holes 51a. The inner circumferential surfaces of the holes 51a swingably support the external gear 51 around the central axis J1 via the pins 53b.

The output section 60 is a portion configured to output a driving force of the electric actuator 10. As shown in FIG. 3, the output section 60 is disposed outside the motor unit 40 in the radial direction. The output section 60 has an output shaft 61, a driving gear 62, a sensor magnet 63 for an output section, and a magnet holder 64.

As shown in FIG. 4, the output shaft 61 has a cylindrical shape extending in the axial direction Z of the motor shaft 41. In this way, since the output shaft 61 extends in the same direction as the motor shaft 41, a structure of the speed reducer 50 configured to transmit rotation of the motor shaft 41 to the output shaft 61 can be simplified. In the embodiment, the output shaft 61 has a cylindrical shape about an output central axis J3 that is a virtual axis. The output central axis J3 is parallel to the central axis J1 and disposed apart from the central axis J1 in the radial direction. That is, the motor shaft 41 and the output shaft 61 are disposed apart in the radial direction of the motor shaft 41.

As shown in FIG. 3, the output shaft 61 has an opening section 61d that opens downward. In the embodiment, the output shaft 61 opens at both sides in the axial direction. The output shaft 61 has a spline groove formed at a lower section of an inner circumferential surface thereof. The output shaft 61 has an output shaft main body 61a formed in a cylindrical shape, and a flange section 61b protruding from the output shaft main body 61a toward an outer side of the output central axis J3 in the radial direction. The output shaft 61 is disposed at a position overlapping the rotor main body 42 in the radial direction of the motor shaft 41. A lower end portion of the output shaft 61, i.e., the opening section 61d, is disposed above a lower end portion of the motor unit 40. In the embodiment, the lower end portion of the motor unit 40 is a lower end portion of the motor shaft 41.

A driven shaft DS is inserted and connected to the output shaft 61 via the opening section 61d from below. More specifically, since a spline section formed on an outer circumferential section of the driven shaft DS is fitted into a spline groove formed in an inner circumferential surface of the output shaft 61, the output shaft 61 and the driven shaft DS are connected to each other. A driving force of the electric actuator 10 is transmitted to the driven shaft DS via the output shaft 61. Accordingly, the electric actuator 10 rotates the driven shaft DS around the output central axis J3.

As described above, a side in the axial direction Z in which the opening section 61d into which the driven shaft DS is inserted opens is the same side as that on which the motor unit 40 is disposed with respect to the speed reducer 50. For this reason, the motor unit 40 can be disposed on a side of an attachment object to which the electric actuator 10 is attached. Accordingly, in the radial direction of the driven shaft DS, a space outside the driven shaft DS can be used as a space in which the motor unit 40 is disposed. Accordingly, the electric actuator 10 can be attached to the attachment object in a state in which the electric actuator 10 is closer to the attachment object. For this reason, according to the embodiment, it is possible to obtain the electric actuator 10 capable of decreasing an attachment height when attached to the attachment object. In the embodiment, the attachment object is a vehicle.

In addition, according to the embodiment, a direction in which the motor shaft 41 extends from the motor unit 40 toward the speed reducer 50 is an upward direction, which is opposite to a direction in which the opening section 61d of the output shaft 61 opens. For this reason, a direction in which the output shaft 61 extends from the speed reducer 50 may be a direction opposite to a direction in which the motor shaft 41 extends from the motor unit 40 toward the speed reducer 50. Accordingly, the motor shaft 41 and the output shaft 61 can be disposed to overlap each other in the radial direction of the motor shaft 41, and the electric actuator 10 can be reduced in size in the axial direction Z. In addition, since the output shaft 61 overlaps the rotor main body 42 in the radial direction of the motor shaft 41, the electric actuator 10 can be further reduced in size in the axial direction Z. Accordingly, an attachment height of the electric actuator 10 is more easily decreased when attached to the attachment object.

In addition, according to the embodiment, a lower end portion of the motor unit 40 is disposed below the opening section 61d. For this reason, the motor unit 40 can be disposed closer to the attachment object. Accordingly, an attachment height of the electric actuator 10 is more easily decreased when attached to the attachment object.

The driving gear 62 is fixed to the output shaft 61 and meshed with the output gear 53. In the embodiment, the driving gear 62 is fixed to a portion of an outer circumferential section of the output shaft main body 61a above the flange section 61b. The driving gear 62 comes in contact with an upper surface of the flange section 61b. As shown in FIG. 4, the driving gear 62 is a fan-shaped gear extending from the output shaft 61 toward the output gear 53 and having a width that is increased toward the output gear 53. A gear section is formed on an end portion of the driving gear 62 on the side of the output gear 53. The gear section of the driving gear 62 is meshed with the gear section of the output gear 53.

As shown in FIG. 3, the magnet holder 64 is a substantially cylindrical member extending in the axial direction Z about the output central axis J3. The magnet holder 64 opens at both sides in the axial direction. The magnet holder 64 is disposed above the output shaft 61 and outside the speed reducer 50 in the radial direction. The magnet holder 64 passes through the circuit board 70 in the axial direction Z. An inner side of the magnet holder 64 is connected to an inner side of the output shaft 61. An upper end portion of the driven shaft DS inserted into the output shaft 61 is press-fitted into the magnet holder 64. Accordingly, the magnet holder 64 is fixed to the driven shaft DS.

The sensor magnet 63 for an output section has an annular shape about the output central axis J3. The sensor magnet 63 for an output section is fixed to an outer circumferential section in an upper end portion of the magnet holder 64. Since the magnet holder 64 is fixed to the driven shaft DS, the sensor magnet 63 for an output section is fixed to the driven shaft DS via the magnet holder 64. The sensor magnet 63 for an output section faces an upper surface of the circuit board 70 via a gap.

When the motor shaft 41 is rotated around the central axis J1, the eccentric shaft section 41a revolves about the central axis J1 in the circumferential direction. Revolution of the eccentric shaft section 41a is transmitted to the external gear 51 via the third bearing 44c, and the external gear 51 swings while positions at which the inner circumferential surfaces of the holes 51a inscribe the outer circumferential sections of the pins 53b vary. Accordingly, a position at which the gear section of the external gear 51 is meshed with the gear section of the internal gear 52 varies in the circumferential direction. Accordingly, a rotating force of the motor shaft 41 is transmitted to the internal gear 52 via the external gear 51.

Here, in the embodiment, the internal gear 52 is not rotated because the internal gear 52 is fixed. For this reason, the external gear 51 is rotated around the eccentric shaft J2 by a reaction force of a rotating force transmitted to the internal gear 52. Here, a direction in which the external gear 51 is rotated is a direction opposite to a direction in which the motor shaft 41 is rotated. Rotation of the external gear 51 around the eccentric shaft J2 is transmitted to the output gear 53 via the holes 51a and the pins 53b. Accordingly, the output gear 53 is rotated around the central axis J1. Rotation of the motor shaft 41 is reduced and then transmitted to the output gear 53.

When the output gear 53 is rotated, the driving gear 62 meshed with the output gear 53 is rotated around the output central axis J3. Accordingly, the output shaft 61 fixed to the driving gear 62 is rotated around the output central axis J3. In this way, rotation of the motor shaft 41 is transmitted to the output shaft 61 via the speed reducer 50.

The circuit board 70 is disposed above the rotor main body 42. The circuit board 70 is disposed above the speed reducer 50. The circuit board 70 has a plate shape with a plate surface perpendicular to the axial direction Z. While not shown, a shape of the circuit board 70 seen in the axial direction Z is a shape in which one corner portion of a quadrangular shape is chamfered. That is, a shape of the circuit board 70 seen in the axial direction Z is a pentagonal shape. The circuit board 70 has a through-hole 70a passing through the circuit board 70 in the axial direction Z. The motor shaft 41 passes through the through-hole 70a. Accordingly, the motor shaft 41 passes through the circuit board 70 in the axial direction Z. The circuit board 70 is electrically connected to the stator 43 via the bus bar (not shown). That is, the circuit board 70 is electrically connected to the motor unit 40.

The motor unit sensor 71 is fixed to an upper surface of the circuit board 70. More specifically, the motor unit sensor 71 is fixed to a portion of an upper surface of the circuit board 70 facing the sensor magnet 45 for a motor unit via a gap in the axial direction Z. The motor unit sensor 71 is a magnetic sensor configured to detect a magnetic field of the sensor magnet 45 for a motor unit. The motor unit sensor 71 is, for example, a Hall element. While not shown, for example, three motor unit sensors 71 are installed in the circumferential direction. The motor unit sensor 71 detects rotational displacement of the sensor magnet 45 for a motor unit and detects rotation of the motor shaft 41 by detecting a magnetic field of the sensor magnet 45 for a motor unit.

In the embodiment, the speed reducer 50 is connected to an upper side of the motor shaft 41, and the circuit board 70 is disposed above the rotor main body 42 and on an upper side of the speed reducer 50. For this reason, the speed reducer 50 is disposed between the circuit board 70 and the rotor main body 42 in the axial direction Z. Accordingly, the motor unit sensor 71 fixed to the circuit board 70 can be disposed apart from the rotor main body 42 and the stator 43. Accordingly, the motor unit sensor 71 is less susceptible to the influence of the magnetic field generated from the rotor main body 42 and the stator 43, and detection accuracy of the motor unit sensor 71 can be improved.

The output section sensor 72 is fixed to an upper surface of the circuit board 70. More specifically, the output section sensor 72 is fixed to a portion of an upper surface of the circuit board 70 facing the sensor magnet 63 for an output section via a gap in the axial direction Z. The output section sensor 72 is a magnetic sensor configured to detect a magnetic field of the sensor magnet 63 for an output section. The output section sensor 72 is, for example, a Hall element. While not shown, for example, three output section sensors 72 are installed about the output central axis J3 in the circumferential direction. The output section sensor 72 detects rotational displacement H3 of the sensor magnet 63 for an output section and detects rotation of the driven shaft DS by detecting a magnetic field of the sensor magnet 63 for an output section.

According to the embodiment, the driving gear 62 configured to transmit a rotational driving force to the output gear 53 can be disposed to approach the sensor magnet 63 for an output section by a configuration in which the speed reducer 50 is disposed closer to the circuit board 70 than to the motor unit 40. For this reason, a distance in the axial direction Z from a portion of the output gear 53 to which a rotational driving force is transmitted to a portion to which the sensor magnet 63 for an output section is fixed can be reduced, and axial deviation of the driven shaft DS in a portion to which the sensor magnet 63 for an output section is fixed can be minimized. Accordingly, rotation detection accuracy of the driven shaft DS by the output section sensor 72 can be improved.

The housing 11 accommodates the motor unit 40, the speed reducer 50, the output section 60, the circuit board 70, the motor unit sensor 71, the output section sensor 72, the bus bar holder 90 and the bus bar (not shown). The housing 11 has a motor case 30 and the circuit board case 20. The motor case 30 opens upward. As shown in FIG. 1 to FIG. 3, the motor case 30 has a motor case main body 31, a plurality of attaching leg sections 34, 35 and 36, and a stator fixing member 37. That is, the housing 11 has the motor case main body 31, the plurality of attaching leg sections 34, 35 and 36, and the stator fixing member 37. The circuit board case 20 has a substantially rectangular parallelepiped box shape. As shown in FIG. 3, the circuit board case 20 closes the opening of the motor case 30 attached to an upper side of the motor case 30. The circuit board case 20 accommodates the circuit board 70. The circuit board case 20 has a circuit board case main body 21, the metal member 22 and a circuit board case cover 26. That is, the housing 11 has the circuit board case main body 21, the metal member 22 and the circuit board case cover 26.

The circuit board case main body 21 and the motor case main body 31 are formed of a resin. In the embodiment, a housing main body 11a is constituted by the circuit board case main body 21 and the motor case main body 31. That is, the housing 11 has the housing main body 11a formed of a resin. As shown in FIG. 2, the housing main body 11a has a polygonal shape when seen in the axial direction Z. More specifically, the housing main body 11a has a shape in which one corner portion of a quadrangular shape is chamfered when seen in the axial direction Z. That is, the housing main body 11a has a pentagonal shape when seen in the axial direction Z. The quadrangular shape, one corner portion of which is chamfered, is a substantially square shape including a pair of sides extending in the first direction X and a pair of sides extending in the second direction Y.

In the embodiment, a shape of the circuit board case main body 21 when seen in the axial direction Z is equal to a shape of the circuit board case 20 when seen in the axial direction Z. The motor case main body 31 is disposed inside an external shape of the circuit board case main body 21, i.e., inside an external shape of the circuit board case 20, when seen in the axial direction Z. For this reason, in the embodiment, a shape of the housing main body 11a when seen in the axial direction Z is equal to a shape of the circuit board case 20 when seen the axial direction Z. Further, in the specification, a shape of a certain member when seen in the axial direction Z includes a shape of the outermost shape of a certain member when seen in the axial direction Z.

Figure 5:
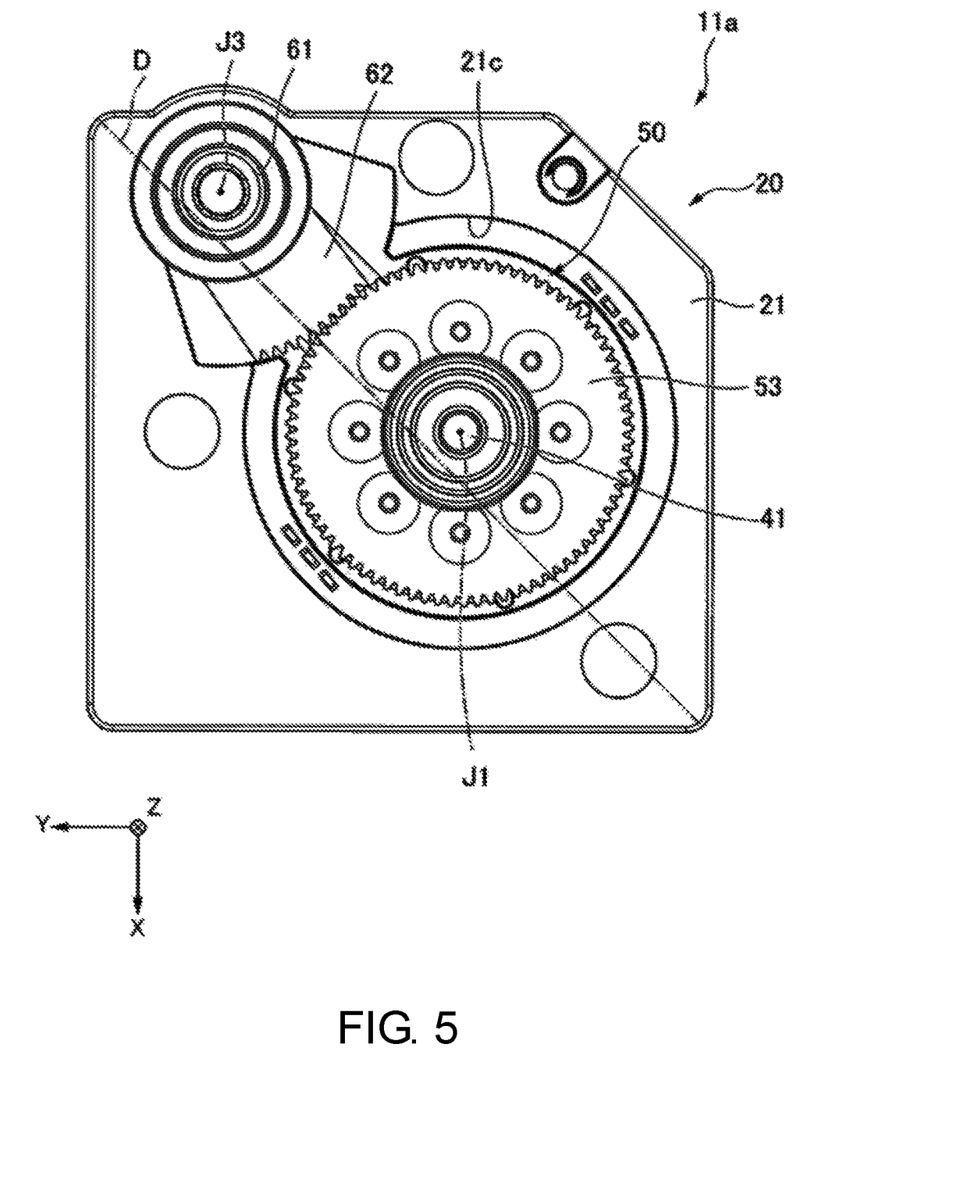
FIG. 5 is a view showing a circuit board case of the embodiment as viewed from below.

A two-dot chain line appropriately shown in the drawings is a diagonal line D of the housing main body 11a when seen in the axial direction Z. In addition, the D-axial direction appropriately shown in the drawings shows a direction parallel to the diagonal line D. As shown in FIG. 5, in the embodiment, the motor shaft 41 and the output shaft 61 are disposed to be arranged along the diagonal line D of the housing main body 11a when seen in the axial direction Z. The output shaft 61 is disposed on a corner portion of the housing main body 11a when seen in the axial direction Z. In this way, since the motor shaft 41 and the output shaft 61 are disposed using the diagonal line D of the housing main body 11a having a polygonal shape when seen in the axial direction Z, even when the motor shaft 41 and the output shaft 61 are disposed apart from each other in the radial direction, the entire electric actuator 10 can be easily reduced in size. Accordingly, according to the embodiment, the electric actuator 10 having a structure in which the motor shaft 41 and the output shaft 61 are disposed apart from each other in the radial direction and a size thereof can be reduced in the radial direction is obtained.

In the specification, "the motor shaft and the output shaft are disposed to be arranged along a diagonal line of the housing main body when seen in the axial direction" means that a direction in which the motor shaft and the output shaft are arranged may be a direction in which a diagonal line extends, or the motor shaft and the output shaft may not overlap the diagonal line when seen in the axial direction.

In addition, in the specification, "the output shaft is disposed on a corner portion of the housing main body when seen in the axial direction" includes that, for example, when a perpendicular bisector is drawn from a center of the housing main body to each side constituting an outer shape of the housing main body when seen in the axial direction, the output shaft is disposed in one region separated by the perpendicular bisector, and the output shaft is disposed at a position close to an apex of an outer shape of the housing main body with respect to the center of the housing main body.

In addition, according to the embodiment, the driving gear 62 is a fan-shaped gear extending from the output shaft 61 toward the output gear 53 and having a width that is increased toward the output gear 53. For this reason, in comparison with the case in which a circular driving gear is used, even when the output shaft 61 is disposed on the corner portion of the housing main body 11a, the driving gear 62 can be disposed without increasing the size of the housing 11. Accordingly, the electric actuator 10 can be further reduced in size.

In the embodiment, the motor shaft 41 is disposed on the central section of the housing main body 11a when seen in the axial direction Z. For this reason, a region in which the speed reducer 50 connected to the motor shaft 41 is disposed is easily secured while reducing the size of the housing 11.

In the specification, "the motor shaft is disposed on a central section of the housing main body when seen in the axial direction" includes, for example, that the motor shaft is disposed to overlap a region close to a center of the housing main body in a direction from the center of the housing main body toward a contour line when seen in the axial direction.

As shown in FIG. 3, the circuit board case main body 21 has a box shape that opens upward. As shown in FIG. 2, the circuit board case main body 21 has a polygonal shape when seen in the axial direction Z. More specifically, the circuit board case main body 21 has a shape in which one corner portion of a quadrangular shape is chamfered when seen in the axial direction Z. That is, the circuit board case main body 21 has a pentagonal shape when seen in the axial direction Z. A place corresponding to a portion of the circuit board case main body 21, a corner portion of a quadrangular shape of which is chamfered, is referred to as a chamfer 21e. The chamfer 21e also corresponds to a portion of the housing main body 11a, a corner portion of the quadrangular shape of which is chamfered. The circuit board case main body 21 is larger than the motor case main body 31 and overlaps the entire motor case main body 31 when seen in the axial direction Z.

As shown in FIG. 3, the circuit board case main body 21 has a bottom wall 21a and a sidewall 21b. That is, the circuit board case 20 has the bottom wall 21a and the sidewall 21b. The bottom wall 21a spreads along a plan perpendicular to the axial direction Z. The bottom wall 21a spreads further outward in the radial direction than the motor case main body 31 when seen in the axial direction Z. The bottom wall 21a closes an opening on an upper side of the motor case 30. The bottom wall 21a covers an upper side of the stator 43.

The bottom wall 21a has a concave section 21c recessed upward from a lower surface of the bottom wall 21a. As shown in FIG. 5, the concave section 21c extends along the diagonal line D. As shown in FIG. 3, the bottom wall 21a has a central through-hole 21d passing through the bottom wall 21a in the axial direction Z. The central through-hole 21d passes through the bottom wall 21a from a bottom surface of the concave section 21c toward an upper surface of the bottom wall 21a. The central through-hole 21d has a circular shape about the central axis J1 when seen in the axial direction Z. The motor shaft 41 passes through the central through-hole 21d.

The sidewall 21b has a rectangular cylindrical shape protruding upward from an outer edge portion of the bottom wall 21a. The circuit board 70 is accommodated inside the sidewall 21b. That is, the circuit board case 20 accommodates the circuit board 70 above the bottom wall 21a. The sidewall 21b opens upward. An upper opening of the sidewall 21b, i.e., an upper opening of the circuit board case 20 is covered by the circuit board case cover 26. The circuit board case cover 26 is formed of, for example, a metal.

As shown in FIG. 1 and FIG. 2, a first connector section 81 and a second connector section 82 are provided on the circuit board case 20. That is, the electric actuator 10 includes the first connector section 81 and the second connector section 82. The first connector section 81 and the second connector section 82 are portions to which an external apparatus is connected. The external apparatus is, for example, a power supply apparatus or the like configured to supply power to the motor unit 40.

As shown in FIG. 2, the first connector section 81 and the second connector section 82 protrude outward from the housing main body 11a, i.e., outward from the circuit board case 20 when seen in the axial direction Z. In the embodiment, the first connector section 81 and the second connector section 82 protrude from the circuit board case 20 toward one side in the first direction X. The first connector section 81 and the second connector section 82 are disposed to be arranged in the second direction Y perpendicular to the axial direction Z when seen in the axial direction Z. The first connector section 81 and the second connector section 82 each has a rectangular cylindrical shape that opens toward a side opposite to the circuit board case 20 in the first direction X.

The metal member 22 is formed of a metal. As shown in FIG. 3, the metal member 22 is held by the circuit board case main body 21. That is, the metal member 22 is held by the housing main body 11a. The metal member 22 is accommodated in and held by the concave section 21c. In the embodiment, a part of the metal member 22 is buried in the housing main body 11a. For this reason, a part or the whole of the housing main body 11a can be fabricated through insert molding in which the metal member 22 is inserted into a mold and a resin is poured thereinto. Accordingly, fabrication of the housing 11 is facilitated. In the embodiment, the circuit board case main body 21 of the housing main body 11a is fabricated through insert molding in which the metal member 22 is inserted into a mold and a resin is poured thereinto.

Figure 6:
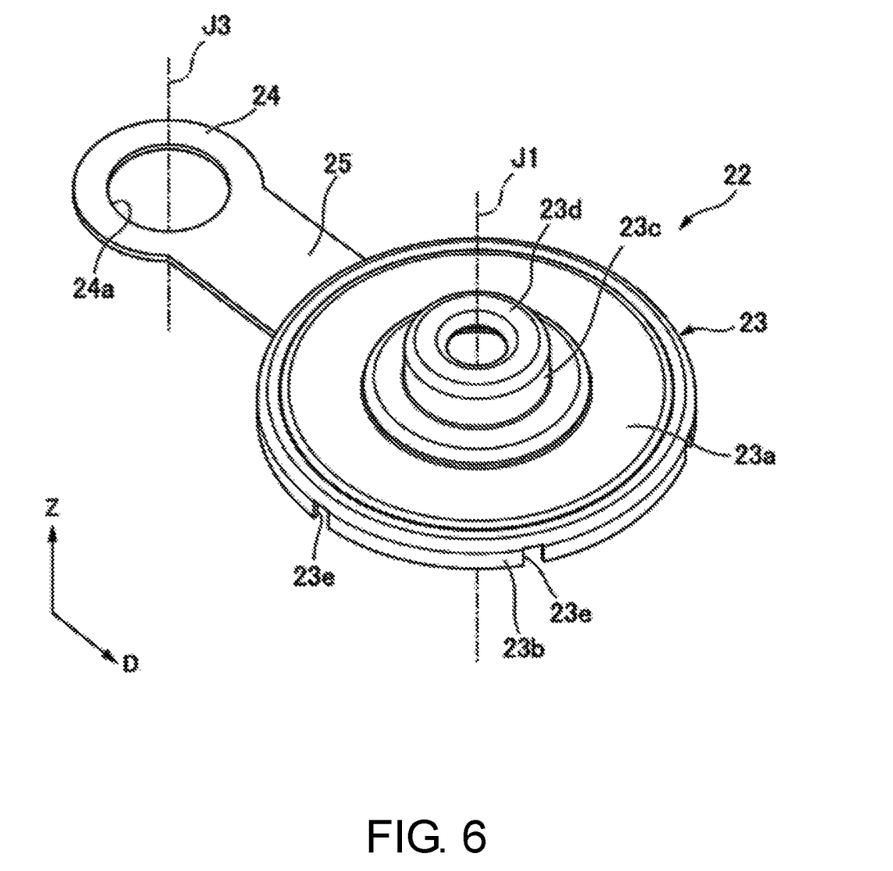
FIG. 6 is a perspective view showing a metal member of the embodiment.

As shown in FIG. 6, the metal member 22 has a bearing holding section 23, an arm section 25 and an output shaft support section 24. The bearing holding section 23 has an annular plate section 23a, an outer cylindrical section 23b, an inner cylindrical section 23c and a top plate section 23d. The annular plate section 23a has an annular plate shape about the central axis J1. A plate surface of the annular plate section 23a is perpendicular to the axial direction Z.

The outer cylindrical section 23b has a cylindrical shape protruding downward from an outer circumferential edge portion of the annular plate section 23a. The outer cylindrical section 23b has a plurality of slits 23e passing through a wall section of the outer cylindrical section 23b in the radial direction. The plurality of slits 23e are disposed throughout the circumference in the circumferential direction at equal intervals. The slits 23e open downward.

As shown in FIG. 3, the internal gear 52 is held inside the outer cylindrical section 23b in the radial direction. Accordingly, the speed reducer 50 is held by a lower surface of the bottom wall 21a via the metal member 22. While not shown, the protrusion sections 52b of the internal gear 52 are inserted into the slits 23e, respectively. Accordingly, the protrusion sections 52b can be suppressed from being caught on the inner surfaces of the slits 23e, or the internal gear 52 can be suppressed from moving with respect to the metal member 22 in the circumferential direction. The outer cylindrical section 23b is buried and held inside the central through-hole 21d in the radial direction.

The inner cylindrical section 23c has a cylindrical shape protruding upward from the inner circumferential edge portion of the annular plate section 23a. The first bearing 44a is held inside the inner cylindrical section 23c in the radial direction. Accordingly, the bearing holding section 23 holds the first bearing 44a. The inner cylindrical section 23c protrudes upward from the bottom wall 21a. The inner cylindrical section 23c is disposed inside the sidewall 21b in the radial direction. The inner cylindrical section 23c passes through the circuit board 70 in the axial direction Z via the through-hole 70a, and protrudes upward from the circuit board 70.

Accordingly, at least a part of the first bearing 44a held by the inner cylindrical section 23c is inserted through the through-hole 70a. For this reason, the motor shaft 41 can be supported by the first bearing 44a at a position close to a portion of the motor shaft 41 to which the sensor magnet 45 for a motor unit is attached. Accordingly, deviation of an axis of a portion of the motor shaft 41 to which the sensor magnet 45 for a motor unit is attached can be minimized, and deviation of a position of the sensor magnet 45 for a motor unit can be minimized. Accordingly, a decrease in rotation detection accuracy of the motor shaft 41 by the motor unit sensor 71 can be minimized. In addition, since the first bearing 44a and the circuit board 70 can be disposed to overlap each other when seen in the radial direction, the electric actuator 10 can be easily reduced in size in the axial direction Z.

In the specification, "the bearing holding section holds the first bearing" may mean that the bearing holding section may position the first bearing in the radial direction, or the first bearing may not be fixed to the bearing holding section. In the embodiment, since the first bearing 44a is fitted into the inner cylindrical section 23c, the first bearing 44a is positioned in the radial direction. The first bearing 44a is not fixed to the inner cylindrical section 23c.

The top plate section 23d protrudes from an upper end portion of the inner cylindrical section 23c toward an inner side in the radial direction. The top plate section 23d has an annular shape about the central axis J1, and a plate surface has a plate shape perpendicular to the axial direction Z. An upper end portion of the motor shaft 41 is inserted through the inside of the top plate section 23d. An inner circumferential edge portion of the top plate section 23d is curved downward. The top plate section 23d covers an upper side of the first bearing 44a.

A pre-load member 47 is disposed between the top plate section 23d and the first bearing 44a in the axial direction Z. That is, the electric actuator 10 includes the pre-load member 47. The pre-load member 47 is an annular waved washer extending in the circumferential direction. The pre-load member 47 comes in contact with a lower surface of the top plate section 23d and an upper end portion of an outer wheel of the first bearing 44a. The pre-load member 47 applies a downward pre-load to the outer wheel of the first bearing 44a.

The arm section 25 extends from the bearing holding section 23 toward an outer side of the motor shaft 41 in the radial direction. More specifically, the arm section 25 extends from a lower end portion of the outer cylindrical section 23b in the diagonal line D. As shown in FIG. 6, the arm section 25 has a plate shape with a plate surface that is perpendicular to the axial direction Z. The arm section 25 has a rectangular shape elongated in a direction in which the diagonal line D extends when seen in the axial direction Z. The arm section 25 connects the bearing holding section 23 and the output shaft support section 24. Accordingly, a size of a portion of the metal member 22 other than the bearing holding section 23 and the output shaft support section 24 can be minimized to a minimum level, and the metal member 22 is easily reduced in size. Accordingly, manufacturing costs of the housing 11 can be easily reduced, and the weight of the housing 11 can be easily reduced.

The output shaft support section 24 is connected to an outer end portion of the arm section 25 in the radial direction. The output shaft support section 24 has an annular shape about the output central axis J3, and a plate shape, a plate surface of which is perpendicular to the axial direction Z. In this way, according to the embodiment, since the output shaft support section 24 and the arm section 25 have a plate shape, the output shaft support section 24 and the arm section 25 can be easily fabricated through pressing such as punching, folding, or the like, of a metal plate member. In the embodiment, the metal member 22 is a single member fabricated through pressing of a metal plate member.

The output shaft support section 24 has a through-hole 24a passing through the output shaft support section 24 in the axial direction Z. As shown in FIG. 3, a fitting section 61c that is an upper end portion of the output shaft main body 61a is fitted into the through-hole 24a. That is, the output shaft 61 has the fitting section 61c fitted into the through-hole 24a. Accordingly, the output shaft support section 24 supports the output shaft 61.

In this way, according to the embodiment, the first bearing 44a can be held and the output shaft 61 can be supported by the metal member 22 formed of a metal. Accordingly, the motor shaft 41 and the output shaft 61 supported by the first bearing 44a can be disposed with good relative positional accuracy. In addition, since the housing main body 11a by which the metal member 22 is held is formed of a resin, the housing 11 can be reduced in weight. Accordingly, according to the embodiment, the electric actuator 10 having a structure in which reduction in weight can be achieved and a decrease in relative positional accuracy of the motor shaft 41 and the output shaft 61 can be minimized is obtained. In addition, since the metal member 22 is formed of a metal, strength and a thermal resistance are higher than those of the resin. For this reason, even when an external force and heat are added to the housing 11, deformation/damage to the metal member 22 can be minimized, and deviation of the motor shaft 41 and the output shaft 61 can be minimized.

In addition, according to the embodiment, since the fitting section 61c is fitted into the through-hole 24a, the output shaft 61 can be easily supported with respect to the metal member 22 and positioning can be easily performed. Accordingly, assembly of the electric actuator 10 can be facilitated.

Figure 7:
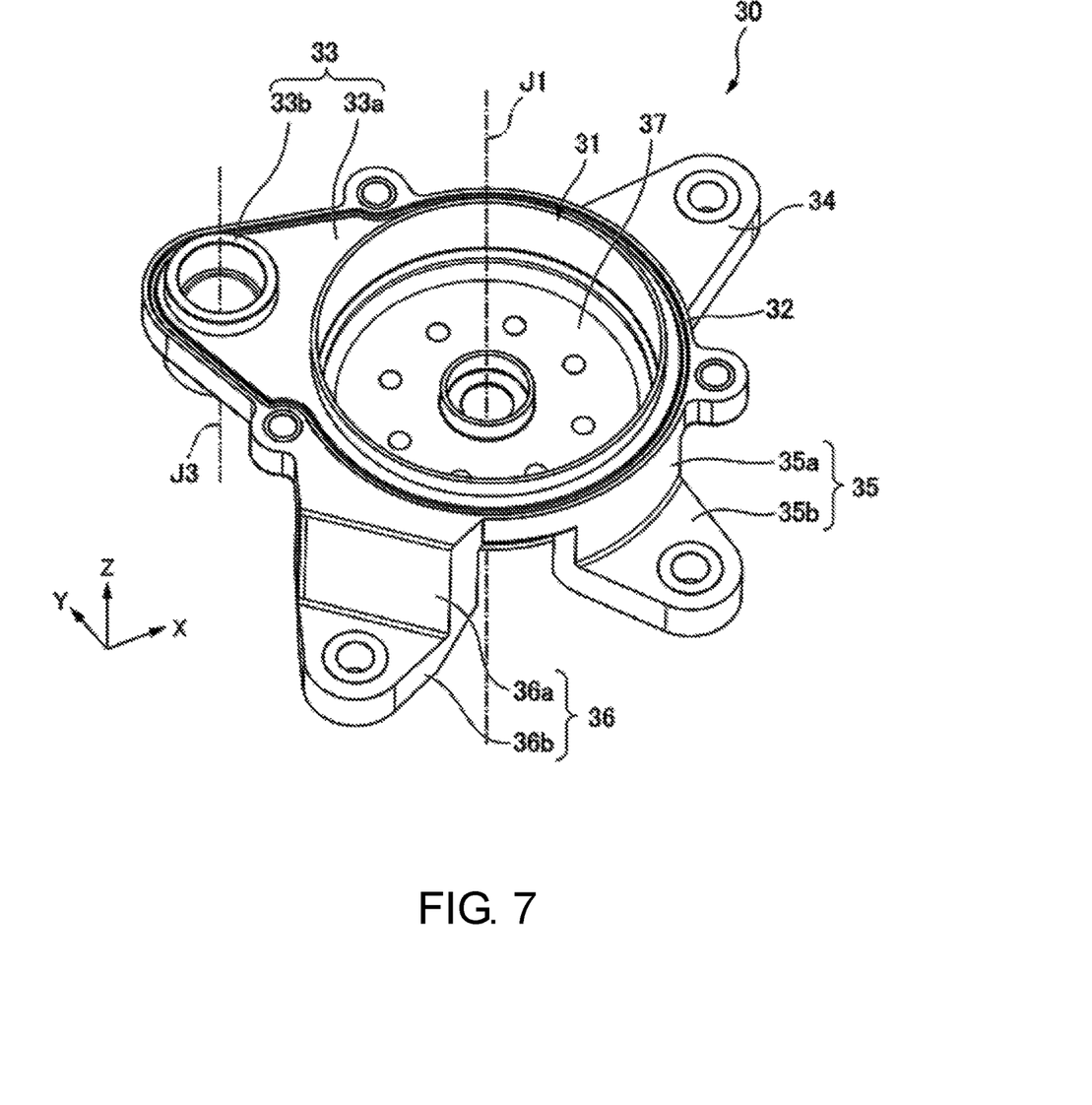
FIG. 7 is a perspective view showing a motor case of the embodiment.

As shown in FIG. 7, the motor case main body 31 has a motor accommodating section 32 and an output section holding section 33. The motor accommodating section 32 has a cylindrical shape having a bottom section and opening upward. The motor accommodating section 32 has a cylindrical shape about the central axis J1. As shown in FIG. 3, the motor accommodating section 32 accommodates the motor unit 40. That is, the motor case main body 31 accommodates the motor unit 40.

Further, in the specification, "the motor case main body accommodates the motor unit" may include that a part of the motor unit may be accommodated by the motor case main body or another part of the motor unit may protrude to the outside of the motor case main body. In the embodiment, the motor case main body 31, i.e., the motor accommodating section 32 accommodates a lower portion of the motor shaft 41, the rotor main body 42, the stator 43, and the second bearing 44b.

As shown in FIG. 7, the output section holding section 33 protrudes from the motor accommodating section 32 toward an outer side in the radial direction. The output section holding section 33 has a base section 33a and an output shaft holding section 33b. The base section 33a protrudes from the motor accommodating section 32 toward an outer side in the radial direction. A width of the base section 33a is reduced toward an outer side in the radial direction when seen in the axial direction Z. The output shaft holding section 33b protrudes an outer end portion of the base section 33a in the radial direction toward both sides in the axial direction. The output shaft holding section 33b has a cylindrical shape about the output central axis J3. The output shaft holding section 33b opens toward both sides in the axial direction. The inside of the output shaft holding section 33b passes through the base section 33a in the axial direction Z.

As shown in FIG. 3, a cylindrical bush 65 is fitted into the output shaft holding section 33b. A flange section protruding outward in the radial direction about the output central axis J3 is formed on an upper end portion of the bush 65. The flange section of the bush 65 is supported by an upper end portion of the output shaft holding section 33b from below. A portion of the output shaft main body 61a below the flange section 61b is fitted into the bush 65. The bush 65 rotatably supports the output shaft 61 around the output central axis J3. The flange section 61b is supported by an upper end portion of the output shaft holding section 33b from below via the flange section of the bush 65. The opening section 61d below the output shaft 61 is disposed below the bush 65.

As shown in FIG. 7, the attaching leg sections 34, 35 and 36 protrude from the motor case main body 31. More specifically, the attaching leg sections 34, 35 and 36 protrude outward from the motor accommodating section 32 in the radial direction. The attaching leg sections 34, 35 and 36 are portions fixed to the vehicle. In this way, according to the embodiment, since the motor case 30 has the attaching leg sections 34, 35 and 36, there is no need of a bracket configured to attach the electric actuator 10 to the vehicle. Accordingly, the number of parts when attached to the electric actuator 10 can be reduced. Accordingly, according to the embodiment, the electric actuator 10 having a structure in which labor for attachment to the vehicle can be reduced is obtained.

In addition, since the attaching leg sections 34, 35 and 36 are provided in the motor case 30 that accommodates the motor unit 40, a distance until vibrations of the motor unit 40 are transmitted to the vehicle can be reduced. Accordingly, amplification of vibrations of the motor unit 40 and transmission to the vehicle can be minimized. In addition, even when a shape of a portion of the vehicle to which the electric actuator 10 is attached is varied, it can easily respond by exchanging only the motor case 30.

As shown in FIG. 2, the attaching leg sections 34, 35 and 36 protrude outward from the housing main body 11a, i.e., outward from the circuit board case 20 when seen in the axial direction Z. For this reason, the electric actuator 10 is stably easily attached to the vehicle. At least one of the attaching leg sections 34, 35 and 36 protrudes from a portion between the neighboring corner portions of the housing main body 11a to an outer side of the housing main body 11a when seen in the axial direction Z. For this reason, in comparison with the case in which the attaching leg sections 34, 35 and 36 protrude from the corner portions of the housing main body 11a when seen in the axial direction Z, the electric actuator 10 is easily reduced in size. In the embodiment, all of the attaching leg sections 34, 35 and 36 protrude from the portions between the neighboring corner portions of the housing main body 11a to an outer side of the housing main body 11a when seen in the axial direction Z.

Further, in the embodiment, the neighboring corner portions of the housing main body 11a correspond to the neighboring corner portions of the circuit board case 20, and the attaching leg sections 34, 35 and 36 protrude from the portions between the neighboring corner portions of the circuit board case 20 to an outer side of the circuit board case 20 when seen in the axial direction Z.

As shown FIG. 7, the attaching leg section 34 protrudes from the motor accommodating section 32 toward an outer side in the radial direction. In the embodiment, the attaching leg section 34 protrudes in the first direction X in the radial direction. A width of the attaching leg section 34 is reduced toward an outer side in the radial direction when seen in the axial direction Z. A through-hole through which a screw is inserted is formed in the attaching leg section 34 to fix the attaching leg section 34 to the vehicle.

The attaching leg section 35 has an axial projection 35a protruding downward from the motor accommodating section 32, and a radial projection 35b protruding from a lower end portion of the axial projection 35a toward an outer side in the radial direction. In the embodiment, the radial projection 35b protrudes in the second direction Y in the radial direction. A width of the radial projection 35b is reduced toward an outer side in the radial direction when seen in the axial direction Z. A through-hole through which a screw is inserted is formed in the radial projection 35b to fix the radial projection 35b to the vehicle.

The attaching leg section 36 has an axial projection 36a protruding downward from the motor accommodating section 32, and a radial projection 36b protruding from a lower end portion of the axial projection 36a to an outer side in the radial direction. The axial projection 36a protrudes downward from the axial projection 35a. In the embodiment, the radial projection 36b protrudes in a direction crossing both of the first direction X and the second direction Y in the radial direction. A width of the radial projection 36b is reduced toward an outer side in the radial direction when seen in the axial direction Z. A through-hole through which a screw is inserted is formed in the radial projection 36b to fix the radial projection 36b to the vehicle.

At least one of the attaching leg sections 34, 35 and 36 is disposed between the first connector section 81 and the second connector section 82 when seen in the axial direction Z. In the embodiment, the attaching leg section 34 is disposed between the first connector section 81 and the second connector section 82 when seen in the axial direction Z. For this reason, for example, in comparison with the case in which the attaching leg section 34 is disposed at a side opposite to the first connector section 81 and the second connector section 82 in the first direction X, a dimension of the electric actuator 10 in the first direction X is easily reduced. In addition, for example, in comparison with the case in which the attaching leg section 34 is disposed at a side opposite to the attaching leg section 35 in the second direction Y, a dimension of the electric actuator 10 in the second direction Y is easily reduced. In addition, since the attaching leg section 34 is disposed between the first connector section 81 and the second connector section 82, an increase in size of the electric actuator 10 in the second direction Y can be minimized.

At least one of the attaching leg sections 34, 35 and 36 protrudes from the chamfer 21e to an outer side of the housing main body 11a, i.e., an outer side of the circuit board case 20 when seen in the axial direction Z. In the embodiment, the attaching leg section 36 protrudes from the chamfer 21e to an outer side of the housing main body 11a, i.e., an outer side of the circuit board case 20 when seen in the axial direction Z. For this reason, in comparison with the case in which the attaching leg section 36 is disposed on a corner portion that is not chamfered, the electric actuator 10 is easily reduced in size.

The attaching leg sections 34, 35 and 36 are formed of a resin. In the embodiment, the motor case main body 31 and the attaching leg sections 34, 35 and 36 are formed integrally with each other through injection molding. That is, the motor case 30 has a resin member having the motor case main body 31 and the attaching leg sections 34, 35 and 36, and the resin member is a single member. For this reason, the motor case main body 31 and the attaching leg sections 34, 35 and 36 can be easily fabricated through injection molding.

As shown in FIG. 3, the stator fixing member 37 has a cylindrical shape having a bottom section and opening upward. The stator fixing member 37 has a cylindrical shape about the central axis J1. The stator fixing member 37 is fitted into the motor accommodating section 32. A plurality of through-holes disposed in the circumferential direction are formed in a bottom section of the stator fixing member 37. A plurality of protrusions formed on the bottom section of the motor accommodating section 32 are fitted into the through-holes of the stator fixing member 37, respectively.

An upper end portion of the stator fixing member 37 protrudes upward from the motor accommodating section 32. The second bearing 44b is held by the bottom section of the stator fixing member 37. An outer circumferential section of the stator 43 is fixed to an inner circumferential surface of the stator fixing member 37. The stator fixing member 37 is formed of a metal. The motor case 30 is fabricated through, for example, insert molding in which a resin is poured into a mold in a state in which the stator fixing member 37 is inserted into the mold.

The bus bar holder 90 is disposed in an upper opening of the stator fixing member 37. The bus bar holder 90 has a plate shape having an annular shape about the central axis J1, and a plate surface is perpendicular to the axial direction Z. The bus bar holder 90 holds a bus bar (not shown). The bus bar holder 90 covers an upper side of the stator 43.

The disclosure is not limited to the above-mentioned embodiment and another configuration can be employed. The housing main body may be a single member. The housing main body may be fabricated as a single body through injection molding. In this case, the metal member is held by the housing main body after the housing main body is fabricated. A shape of the housing main body is not particularly limited. A shape in which at least one corner portion of a quadrangular shape is chamfered may be employed as a shape of the housing main body when seen in the axial direction. That is, the shape of the housing main body may be a shape in which two or more corner portions of the quadrangular shape are chamfered when seen in the axial direction. The housing main body may have a polygonal shape other than a pentagonal shape, may be a circular shape, or may be an oval shape, when seen in the axial direction.

The attaching leg section is not particularly limited. The plurality of attaching leg sections may protrude from the chamfer of the housing main body or may protrude from a space between the first connector section and the second connector section when seen in the axial direction. The attaching leg sections may be separate members from the motor case main body. The number of attaching leg sections is not particularly limited. The attaching leg section may not be provided.

The metal member is not particularly limited as long as the bearing holding section and the output shaft support section are provided. The metal member may be constituted by connecting a plurality of separate members. The first bearing, the second bearing, the third bearing and the fourth bearing may be not ball bearings or may be sliding bearings or the like. A configuration of a speed reducer is not particularly limited. A direction in which the output shaft extends may be different from a direction in which the motor shaft extends.

The opening section of the output shaft into which the driven shaft is inserted may open upward. A position at which the output shaft is disposed is not particularly limited as long as the output shaft is disposed apart from the motor shaft in the radial direction. The motor shaft may be disposed on a corner portion of the housing main body when seen in the axial direction. The circuit board may be disposed below the motor unit.

A use of the electric actuator of the above-mentioned embodiment is not particularly limited and may be mounted other than the vehicle. In addition, each of the above-mentioned configurations can be appropriately combined while being not inconsistent with each other.

Features of the above-described embodiments and the modifications thereof may be combined appropriately as long as no conflict arises.

While embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An electric actuator, comprising:
   a motor unit, having a motor shaft extending in an axial direction;
   a speed reducer, connected to one side of the motor shaft in the axial direction;
   an output section, having an output shaft to which rotation of the motor shaft is transmitted via the speed reducer; and
   a housing, configured to accommodate the motor unit, the speed reducer, and the output section,
   wherein the motor shaft and the output shaft are disposed apart from each other n a radial direction of the motor shaft,
      the motor unit has a first bearing configured to rotatably support the motor shaft,
      the housing has:
         a housing main body, formed of a resin; and
         a metal member, formed of a metal and held by the housing main body, and the metal member has:
            a bearing holding section, configured to hold the first bearing; and
            an output shaft support section, configured to support the output shaft,
      the output shaft is rotated around an output central axis.

2. The electric actuator according to claim 1, wherein the output shaft support section has a through-hole passing through the output shaft support section, and the output shaft has a fitting section fitted into the through-hole.

3. The electric actuator according to claim 1, wherein
the metal member has an arm section extending outward in the radial direction from the bearing holding section toward the output shaft support section, and
the arm section connects the bearing holding section and the output shaft support section.

4. The electric actuator according to claim 2, wherein
the metal member has an arm section extending from the bearing holding section toward an outer side of the motor shaft in the radial direction, and
the arm section connects the bearing holding section and the output shaft support section.

5. The electric actuator according to claim 4, wherein
the output shaft support section and the arm section have plate shapes.

6. The electric actuator according to claim 1, wherein
the output shaft extends in parallel to the axial direction of the motor shaft.

7. The electric actuator according to claim 6, wherein
the housing main body has a polygonal shape when seen in the axial direction,
the motor shaft and the output shaft are disposed to be arranged along a diagonal line of the housing main body when seen in the axial direction, and
the output shaft is disposed on a corner portion of the housing main body when seen in the axial direction.

8. The electric actuator according to claim 7, wherein
the speed reducer has an output gear to which rotation of the motor shaft is reduced in speed and transmitted,
the output section has a driving gear fixed to the output shaft and meshed with the output gear, and
the driving gear is a fan-shaped gear extending from the output shaft toward the output gear and having a width that is increased toward the output gear.

9. The electric actuator according to claim 1, wherein
a part of the metal member is buried in the housing main body.

10. The electric actuator according to claim 2, wherein
a part of the metal member is buried in the housing main body.

11. The electric actuator according to claim 3, wherein
a part of the metal member is buried in the housing main body.

12. The electric actuator according to claim 4, wherein
a part of the metal member is buried in the housing main body.

13. The electric actuator according to claim 5, wherein
a part of the metal member is buried in the housing main body.

* * * * *